(12) United States Patent
Qiu

(10) Patent No.: US 11,392,612 B2
(45) Date of Patent: *Jul. 19, 2022

(54) DATA PROCESSING METHOD AND DEVICE

(71) Applicant: ADVANCED NEW TECHNOLOGIES CO., LTD., Grand Cayman (KY)

(72) Inventor: Honglin Qiu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 455 days.

This patent is subject to a terminal disclaimer.

(21) Appl. No.: 16/507,983

(22) Filed: Jul. 10, 2019

(65) Prior Publication Data
US 2019/0332608 A1    Oct. 31, 2019

Related U.S. Application Data

(63) Continuation of application No. PCT/CN2018/075571, filed on Feb. 7, 2018.

(30) Foreign Application Priority Data

Feb. 17, 2017  (CN) .......................... 201710085752.6

(51) Int. Cl.
*G06F 17/00* (2019.01)
*G06F 16/27* (2019.01)
(Continued)

(52) U.S. Cl.
CPC .......... *G06F 16/27* (2019.01); *G06F 11/1004* (2013.01); *G06F 16/2246* (2019.01);
(Continued)

(58) Field of Classification Search
None
See application file for complete search history.

(56) References Cited

U.S. PATENT DOCUMENTS 5,924,094 A    7/1999  Sutter
8,874,842 B1  10/2014  Kimmel et al.
(Continued)

FOREIGN PATENT DOCUMENTS

CN    101651719 A    2/2010
CN    102158559 A    8/2011
(Continued)

OTHER PUBLICATIONS

First Search for Chinese Application No. 201710085752.6 dated Aug. 29, 2019 (1 page).
(Continued)

*Primary Examiner* — Hasanul Mobin

(57) ABSTRACT

Methods, systems, and apparatus, including computer programs encoded on computer storage media, for a data processing method are provided. One of the methods includes: distributing, to one or more computing devices, data of one or more leaf nodes in a blockchain node, for the one or more computing devices to compute checksums of the data of the leaf nodes; and determining, according to the checksums of the data of the leaf nodes, a root checksum of data in the blockchain node. Compared to conventional methods, these methods compute a checksum of data faster and more efficiently, and thus ensure proper generations of blocks and operations of a blockchain.

16 Claims, 7 Drawing Sheets

(51) Int. Cl.
*G06F 16/22* (2019.01)
*G06F 11/10* (2006.01)
*H04L 9/06* (2006.01)
*H04L 9/32* (2006.01)

(52) U.S. Cl.
CPC .......... *H04L 9/0643* (2013.01); *H04L 9/3297* (2013.01); *H04L 2209/38* (2013.01)

(56) References Cited

U.S. PATENT DOCUMENTS

| | | |
|---|---|---|
| 9,298,806 B1 | 3/2016 | Vessenes et al. |
| 9,794,074 B2 | 10/2017 | Toll et al. |
| 9,870,591 B2 | 1/2018 | Shah |
| 10,097,356 B2 | 10/2018 | Zinder |
| 10,116,450 B1 | 10/2018 | Brown et al. |
| 2007/0038572 A1* | 2/2007 | Pastorelli ............... H04L 63/10 705/52 |
| 2008/0065672 A1* | 3/2008 | Bamford ............ G06F 16/2246 707/999.102 |
| 2010/0064166 A1 | 3/2010 | Dubnicki et al. |
| 2010/0094802 A1* | 4/2010 | Luotojarvi .......... G06F 16/2365 707/E17.005 |
| 2010/0309933 A1 | 12/2010 | Stark et al. |
| 2013/0036277 A1 | 2/2013 | Szczepkowski et al. |
| 2014/0108817 A1 | 4/2014 | Chen et al. |
| 2014/0245020 A1 | 8/2014 | Buldas et al. |
| 2015/0254353 A1 | 9/2015 | Gulwani et al. |
| 2015/0278030 A1 | 10/2015 | Zhu |
| 2016/0098723 A1 | 4/2016 | Feeney |
| 2016/0162207 A1* | 6/2016 | Sharma ............... G06F 16/2255 711/162 |
| 2016/0203052 A1* | 7/2016 | Starks ................ G06F 11/1004 711/162 |
| 2016/0203175 A1 | 7/2016 | Kachmar et al. |
| 2016/0253523 A1 | 9/2016 | Kroonmaa et al. |
| 2016/0283920 A1* | 9/2016 | Fisher .................. G06Q 20/065 |
| 2016/0306373 A1 | 10/2016 | Mashima |
| 2016/0313916 A1* | 10/2016 | Sivananainthaperumal ................ G06F 3/0685 |
| 2017/0011460 A1 | 1/2017 | Molinari et al. |
| 2017/0031676 A1 | 2/2017 | Cecchetti et al. |
| 2017/0046536 A1 | 2/2017 | Maximov et al. |
| 2017/0075938 A1* | 3/2017 | Black ....................... G06F 21/64 |
| 2017/0078101 A1 | 3/2017 | Maximov et al. |
| 2017/0103039 A1* | 4/2017 | Shamis ............... H04L 67/1097 |
| 2017/0103468 A1 | 4/2017 | Orsini et al. |
| 2017/0243193 A1* | 8/2017 | Man ..................... G06Q 20/065 |
| 2017/0243212 A1 | 8/2017 | Castinado et al. |
| 2017/0262538 A1 | 9/2017 | Rusinov |
| 2017/0264428 A1 | 9/2017 | Seger, II |
| 2017/0344987 A1 | 11/2017 | Davis |
| 2017/0345011 A1* | 11/2017 | Salami ................... G06Q 20/10 |
| 2018/0060600 A1* | 3/2018 | Hamel .................. H04L 9/0897 |
| 2018/0062835 A1* | 3/2018 | Hamel .................. H04L 9/0891 |
| 2018/0076957 A1 | 3/2018 | Watanabe et al. |
| 2018/0089041 A1* | 3/2018 | Smith ................ G06F 16/2255 |
| 2018/0089641 A1* | 3/2018 | Chan ..................... G06Q 40/06 |
| 2018/0114205 A1 | 4/2018 | Thomas et al. |
| 2018/0122068 A1* | 5/2018 | Garnavi ............... G06K 9/6277 |
| 2018/0183687 A1* | 6/2018 | Dementev ............... G06F 16/22 |
| 2018/0183774 A1* | 6/2018 | Campagna ............ H04L 9/3247 |
| 2018/0189312 A1* | 7/2018 | Alas ........................ G06F 21/64 |
| 2018/0197172 A1 | 7/2018 | Coburn et al. |
| 2018/0262493 A1 | 9/2018 | Andrade |
| 2018/0343128 A1 | 11/2018 | Uhr et al. |
| 2019/0188046 A1 | 6/2019 | Florissi et al. |
| 2019/0238550 A1 | 8/2019 | Zhang et al. |
| 2019/0349733 A1 | 11/2019 | Nolan et al. |

FOREIGN PATENT DOCUMENTS

| | | |
|---|---|---|
| CN | 105719185 A | 6/2016 |
| CN | 105868369 A | 8/2016 |
| CN | 106126722 A | 11/2016 |
| CN | 106330431 A | 1/2017 |
| CN | 106341421 A | 1/2017 |
| CN | 106603198 A | 4/2017 |
| CN | 106686087 A | 5/2017 |
| CN | 107040582 A | 8/2017 |
| JP | 2007-506157 A | 3/2007 |
| JP | 2007-257556 A | 10/2007 |
| JP | 2016-509443 A | 3/2016 |
| JP | 2016-208347 A | 12/2016 |
| JP | 2016-208490 A | 12/2016 |
| KR | 101637868 B1 | 7/2016 |
| RU | 2580425 C1 | 4/2016 |
| RU | 2609078 C2 | 1/2017 |
| WO | 2005017745 A2 | 2/2005 |
| WO | 2015/077378 A1 | 5/2015 |
| WO | 2016/131576 A1 | 8/2016 |
| WO | 2016161073 A1 | 10/2016 |

OTHER PUBLICATIONS

First Office Action for Chinese Application No. 201710085752.6 dated Sep. 6, 2019 with English machine translation (10 pages).
Notice of Allowance for U.S. Appl. No. 16/774,929 dated Apr. 22, 2020.
Ranco Pedro: "Understanding Bitcoin: Cryptography, Engineering and Economics", 2015, Wiley, Ch01-Ch02, Ch05-Ch07, Ch12-Ch 13 (Year: 2015).
Non-Final Office Action for U.S. Appl. No. 16/774,929 dated Mar. 24, 2020.
Office Action and Search Report for Russian Application No. 2019122450 dated Mar. 18, 2020.
Notice of Allowance for Japanese Application No. 2019-544724 dated Aug. 3, 2021.
First Examination Report for Australian Application No. 2018221097 dated Dec. 20, 2019 (5 pages).
Examiner's Report for Canadian Application No. 3051065 dated Feb. 4, 2020 (3 pages).
Search Report for European Application No. 18753905.1 dated Dec. 3, 2019 (5 pages).
Examination Report for European Application No. 18753905.1 dated Jan. 8, 2020 (5 pages).
Patel et al., "Blockchain exhumed", 2017 ISEA Asia Security and Privacy (ISEASP), IEEE, Jan. 29, 2017 (12 pages).
Notice of Allowance for Korena Application No. 10-2019-7022496 dated May 7, 2021.
Written Opinion for Singaporean Application No. 11201906738S dated Jul. 20, 2020.
Office Action for Japanese Application No. 2019-544724 dated Dec. 1, 2020.
Written Opinion for the International Searching Authority and International Search report for International Application No. PCT/CN2018/075571 dated Apr. 27, 2018, 15 pages.
Office Action for Taiwanese Patent Application No. 106139293 dated Apr. 19, 2019, 14 pages.
International Preliminary Report on Patentability for International Application No. PCT/CN2018/075571 dated Aug. 29, 2019, 11 pages.

* cited by examiner

DATA PROCESSING METHOD AND DEVICE

CROSS-REFERENCE TO RELATED APPLICATION

This application is a continuation application of International Patent Application No. PCT/CN2018/075571, filed on Feb. 7, 2018, which is based on and claims priority of the Chinese Patent Application No. 201710085752.6, filed on Feb. 17, 2017 and entitled "DATA PROCESSING METHOD AND DEVICE." The above-referenced applications are incorporated herein by reference in their entirety.

TECHNICAL FIELD

This application relates generally to the field of computer technologies, and more specifically, to a data processing method and device.

BACKGROUND

Blockchain is a novel application of computer technologies including distributed data storage, point-to-point transmission, consensus mechanism, encryption algorithm, etc. A blockchain requires the states of all blockchain nodes (including the state of databases) to be the same. Therefore when a new transaction is produced (i.e., new data is generated) at a blockchain node, the new data needs to be synchronized with all blockchain nodes, and all blockchain nodes need to verify the transaction data.

In conventional technologies, a typical verification method used by blockchain nodes on data is to verify through a bucket-tree-based checksum (e.g., a Hash value). For example, data in the blockchain nodes of "fabric" (an existing blockchain application) is stored in a Merkle tree structure, which comprises one or more leaf nodes (i.e., the buckets). A single computation device (e.g., a terminal device or server) may be used for the blockchain nodes to determine a checksum (e.g., a Hash value) of the above data. For example, a computation device may traverse each leaf node, sort the data of the leaf nodes, splice them into a character string, and compute a checksum of the character string as the checksum of the data of the corresponding leaf node. Then, based on the checksum of the data of each leaf node, the computation device may compute a root checksum (e.g., a root Hash value) of the Merkle tree, which is a checksum of the data in the blockchain node, and the above data may be verified based on this checksum.

However, since only one single computation device is used for computing the root checksum of data in the blockchain nodes and each computation is completed by splicing data of each leaf node into a character string, it will take a long time for a single computation device to complete the above-described computation process when the cumulative data amount in one or more leaf nodes is very high (e.g., 10 million pieces of data). That results in a low computation efficiency, or may even prolong the time for generating blocks, and impedes normal operations of a blockchain.

SUMMARY

In view of the limitations of conventional techniques described above, this specification provides a data processing method and related devices that address at least some of the aforementioned limitations. Various embodiments of this specification can include systems, methods, and non-transitory computer readable media for a data processing method.

The objective of embodiments of this specification is to provide a data processing method and related devices for shortening computation time, improving the computation efficiency, and ensuring normal generation of blocks and normal operations of a blockchain.

This specification first provides a data processing method. This method may comprise: distributing data of one or more leaf nodes in a blockchain node to one or more computing devices for the one or more computing devices to compute checksums of the data of the leaf nodes. This method may further include determining a root checksum of data in the blockchain according to the checksums of the data of the leaf nodes.

In some embodiments, in the aforementioned method, the one or more computing devices may include the blockchain node.

In some embodiments, the distributing data of one or more leaf nodes in a blockchain node to one or more computing devices may comprise: distributing node identifiers of the one or more leaf nodes to the one or more computing devices, receiving data obtaining instructions comprising the node identifiers from the one or more computing devices, and distributing data of one or more leaf nodes in the blockchain node according to the data obtaining instructions to the one or more computing devices.

In some embodiments, in the aforementioned method, the determining a root checksum of data in the blockchain node may comprise receiving the root checksum of the data in the blockchain node from the one or more computing device.

In some embodiments, in the aforementioned method, the determining a root checksum of the data in the blockchain node may comprise: determining a root checksum of a Merkle tree corresponding to the leaf nodes according to the checksums of the data of the leaf nodes; and assigning the root checksum of the Merkle tree to the root checksum of the data in the blockchain node.

In some embodiments, in the aforementioned method, the distributing data of one or more leaf nodes in a blockchain node may comprise: distributing data of a pre-determined number of the leaf nodes to the one or more computing devices according to a number of the leaf nodes in the blockchain node. In distributing data of one or more leaf nodes in a blockchain node, the data may be equally distributed to each of the one or more computing devices.

In some embodiments, in the aforementioned method, the checksums may be Hash values.

This specification further provides another data processing method. This data processing method may comprise: receiving data of a leaf node distributed by a blockchain node; distributing the data of the leaf node into sub-leaf nodes according to a data amount of the data of the leaf node; computing a checksum for data in each of the sub-leaf nodes; and computing the checksum of the data of the leaf node for obtaining a root checksum of data of the blockchain according to the checksums for the data in each of the sub-leaf nodes.

In some embodiments, in the aforementioned method, the distributing the data of the leaf nodes into sub-leaf nodes may comprise: sorting the data of the leaf node; sequentially distributing a pre-determined number of pieces of data from the sorted data of the leaf node to each of the sub-leaf nodes; and setting sub-node identifiers for the sub-leaf nodes. The computing the checksums of the data of the leaf node may comprise: computing the checksum of the data of the leaf node according to the sub-node identifiers of the sub-leaf nodes and the checksum of the data in each of the sub-leaf nodes.

In some embodiments, in the aforementioned method, the sorting the data of the leaf node may comprise sorting the data of the leaf node according to timestamps of the data of the leaf node.

In some embodiments, in the aforementioned method, the computing the checksum of the data of the leaf node for obtaining a root checksum of data in the blockchain node may comprise: computing the checksum of the data in the leaf node, and sending the checksum of the data in the leaf node to the blockchain node for the blockchain node to compute the root checksum of the data in the blockchain node based on the checksum of the data in the leaf node. Alternatively, it may comprise: computing the checksum of the data in the leaf node, determining the root checksum of the data in the blockchain node based on the checksum of the data in the leaf node, and sending the root checksum to the blockchain node.

This specification further provides a data processing device. This device may comprise one or more processors and one or more non-transitory machine-readable memories coupled to the one or more processors and configured with instructions executable by the one or more processors to cause the device to perform operations.

The operations may comprise: distributing data of one or more leaf nodes in a blockchain node to one or more computing devices for the one or more computing devices to compute checksums of the data of the leaf nodes; and determining a root checksum of data in the blockchain node according to the checksums of the data of the leaf nodes.

In some embodiments, in the aforementioned device, in determining a root checksum of data in the blockchain node, the operations may comprise: determining a root checksum of a Merkle tree corresponding to the leaf nodes according to the checksums of the data of the leaf nodes; and assigning the root checksum of the Merkle tree to the root checksum of the data in the blockchain node.

In some embodiments, in the aforementioned device, in distributing data of one or more leaf nodes in a blockchain node, the data may be equally distributed to each of the one or more computing devices.

In some embodiments, in the aforementioned device, the checksums may be Hash values.

In some embodiments, in the aforementioned device, after distributing data of one or more leaf nodes in a blockchain node, the operations may further comprise: distributing the data of one of the one or more leaf nodes into sub-leaf nodes according to a data amount of the data of the leaf node; and computing a checksum for data in each of the sub-leaf nodes. In computing checksums of the data of the leaf nodes, the operations may comprise: computing the checksum of the data of the leaf node according to the checksum for the data in each of the sub-leaf nodes.

In some embodiments, in the aforementioned device, in distributing the data of the leaf node into sub-leaf nodes, the operations may comprise: sorting the data of the leaf node; sequentially distributing a pre-determined number of pieces of data from the sorted data of the leaf node to each of the sub-leaf nodes; and setting sub-node identifiers for the sub-leaf nodes. In computing the checksums of the data of the leaf node, the operations may comprise: computing the checksum of the data of the leaf node according to the sub-node identifiers of the sub-leaf nodes and the checksum of the data in each of the sub-leaf nodes.

In some embodiments, in the aforementioned device, in sorting the data of the leaf node, the operations may comprise: sorting the data of the leaf node according to timestamps of the data of the leaf node.

In some embodiments, in the aforementioned device, in determining a root checksum of data in the blockchain node, the operations may comprise: sending the checksums of the data in the leaf nodes to the blockchain node for the blockchain node to compute the root checksum of the data in the blockchain node based on the checksums of the data in the leaf nodes. Alternatively, the operations may comprise: determining the root checksum of the data in the blockchain node based on the checksums of the data in the leaf nodes, and sending the root checksum to the blockchain node.

As is apparent from the aforementioned technical solutions provided by this specification, in the embodiments of this specification, data of leaf nodes in a blockchain node may be first distributed to one or more computing devices for computing checksums of the data of the leaf nodes. Then, according to the checksums of the data of the leaf nodes computed by the one or more computing devices, a root checksum of the data in the blockchain node may be determined. In this method, the data of the leaf nodes is first distributed to one or more computing devices so that checksums of the data of the leaf nodes may be computed by each computing device. Since the data may be distributed to the computing devices for parallel computation of checksums of the data of the leaf nodes, the computation time may be reduced and computation efficiency may be improved, which ensures normal generation of blocks and normal operations of a blockchain.

BRIEF DESCRIPTION OF THE DRAWINGS

The drawings illustrate some embodiments of this specification, and along with the specification, will be used to describe the embodiments of this specification. The accompanying drawings only illustrate some embodiments, and thus are not an exhaustive depiction, of this specification. Therefore this specification is not limited by the drawings presented herein. Other drawings of the embodiments can be derived from the drawings presented herein by one of ordinary skill in the art without creative efforts.

DETAILED DESCRIPTION

Various embodiments of this specification may include systems, methods, and non-transitory computer readable media for data processing method and related devices.

To enable one of ordinary skill in the art to better understand the technical aspects of this specification, the technical aspects in the embodiments of this specification will be clearly and completely described below with reference to the accompanying drawings. It is obvious that the described embodiments are merely some, but not all, embodiments of this specification. Based on the embodiments of this specification, all other embodiments obtainable by one of ordinary skill in the art without creative effort shall fall within the scope of this specification.

Figure 1:
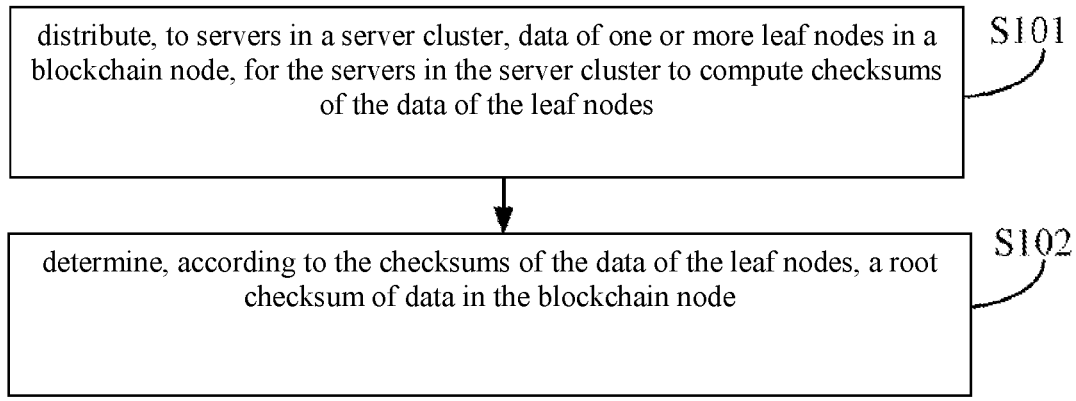
FIG. 1 is a data processing method in accordance with some embodiments of this specification.

As shown in FIG. 1, this specification provides a data processing method. An entity for executing this method may be a blockchain node. The method may comprise the following steps.

In Step S101, data of one or more leaf nodes in a blockchain node may be distributed to one or more computing devices. The computing devices may be, for example, servers in a server cluster. Upon receiving the data, the servers in the server cluster may compute checksums of the data of the leaf nodes.

In this specification, a leaf node may be a node without any sub-node (or child node). A blockchain node typically comprises one or more leaf nodes (i.e., buckets), and each leaf node may store a certain amount of data (for example, transaction data). A numerical range may be set for the data amount of each piece of data stored in the leaf node. For example, the data amount of each piece of data may be within a range of 100 KB to 5 MB, and may be 1 MB in an example. The server cluster may be a group of identical or different servers that are capable of providing corresponding services for one or more transactions. The checksum may be a character string (e.g., a numerical value or a code) used for checking the integrity of a file or data. In one example, the checksum may be a numerical value computed using a validation algorithm based on a data digest. The validation algorithm based on the data digest may be the cyclic redundancy validation algorithm, message digest algorithm, or secure Hash algorithm, etc.

In some embodiments, a blockchain may be a decentralized distributed database, also known as a distributed ledger. Based on the blockchain technology, a distributed network may be formed by numerous information recording devices (e.g., terminal devices or servers). The propagation of every new transaction may go through this distributed network. Based on a Peer-to-Peer (P2P) network layer protocol, information associated with the transaction may be directly sent from an individual blockchain node to all other blockchain nodes within the network, so as to ensure the consistency of data stored in all blockchain nodes in the distributed network. When a blockchain node records a new transaction, the data of the recorded new transaction needs to be synchronized with all other blockchain nodes, and all other blockchain nodes need to verify the data.

An exemplary validation process may be as follows: a blockchain node may comprise one or more leaf nodes, and data in the blockchain node may be distributed among the leaf nodes. All the data in the leaf nodes may comprise reception timestamps, through which a chronological order of transactions may be determined. To validate a transaction, a blockchain node may first determine leaf nodes in the blockchain node. To be able to efficiently determine the leaf nodes (including data of the leaf nodes and a total number of the leaf nodes) stored in the blockchain node, a node identifier (e.g., a node ID (IDentity), such as 5 or A8) may be set for each leaf node when a leaf node is generated. Then, a leaf node may be identified, and the data in the leaf node may be obtained, by searching the corresponding node identifier.

Since data of the leaf nodes may be saved at different time and from different geographic locations, the amount of data stored in different leaf nodes may be different. That is, the amount of data stored in one or more leaf nodes may be relatively larger than those in other leaf nodes, resulting in an imbalance of the data amount in the leaf nodes of a blockchain node. To minimize the impact of such imbalance to the generation of blocks and to reduce computation time for checksums of data in the leaf nodes, the data in the leaf nodes may be distributed to multiple servers in a server cluster, so that the computation burden may be spread through the server cluster, thereby improving the computation efficiency.

After the blockchain node determines data of all leaf nodes, the blockchain node may distribute, in leaf node, the data of the leaf nodes to servers in the server cluster. In one example, the number of servers in a server cluster may be the same as the number of leaf nodes, so that the blockchain node may send data of one leaf node to one server in the server cluster, causing each server in the server cluster to only comprise data of one leaf node. In addition to the above-described distribution manner, some other distribution manners may also be used. For example, leaf nodes and the associated data may be sent to servers in a server cluster in a manner of random distribution. Thus, different servers may receive same number or different numbers of leaf nodes. In another example, data of leaf nodes may be distributed according to the amount of data of the leaf nodes. A blockchain node may count the amount of data of each leaf node, and evenly distribute the data of the leaf nodes to servers in a server cluster. For example, if there are six leaf nodes with an amount of data of 50 MB, 20 MB, 30 MB, 40 MB, 10 MB, and 10 MB, respectively, then the data of the first leaf node (the leaf node with 50 MB of data) may be sent to the first server in the server cluster, the data of the second and third leaf nodes (the leaf nodes with 20 MB and 30 MB of data, respectively) may be sent to the second server in the server cluster, and the data of the remaining three leaf nodes (the leaf nodes with 40 MB, 10 MB, and 10 MB of data, respectively) may be sent to the third server in the server cluster.

After the servers receive the distributed data of leaf nodes, the servers may compute a checksum of the received data for each leaf node. For example, the servers may compute a MD5 value of the data of a leaf node using a message digest algorithm (e.g., the MD5 algorithm). If one server receives data of two leaf nodes (e.g., data of leaf node #1 and data of leaf node #2), the server may compute a checksum for the data of each leaf node (e.g., a MD5 value for the data of leaf node #1 and a MD5 value for the data of leaf node #2).

In Step S102, a root checksum of the data in the blockchain node is determined according to the checksums of the data of the leaf nodes.

In some embodiments, after the servers in the server cluster have computed the checksums of the data of the leaf nodes, each server may send the checksums of the data of the leaf nodes to the blockchain node. Upon receiving the checksums of the data of all the leaf nodes, the blockchain node may compute a root checksum of the data (i.e., the state) in the blockchain node based on the checksums of the data of all the leaf nodes. When computing the root checksum of the data in the blockchain node, to facilitate the computation, a plurality of intermediate nodes may be provided between the leaf nodes and the root node corresponding to the root checksum.

Figure 2:
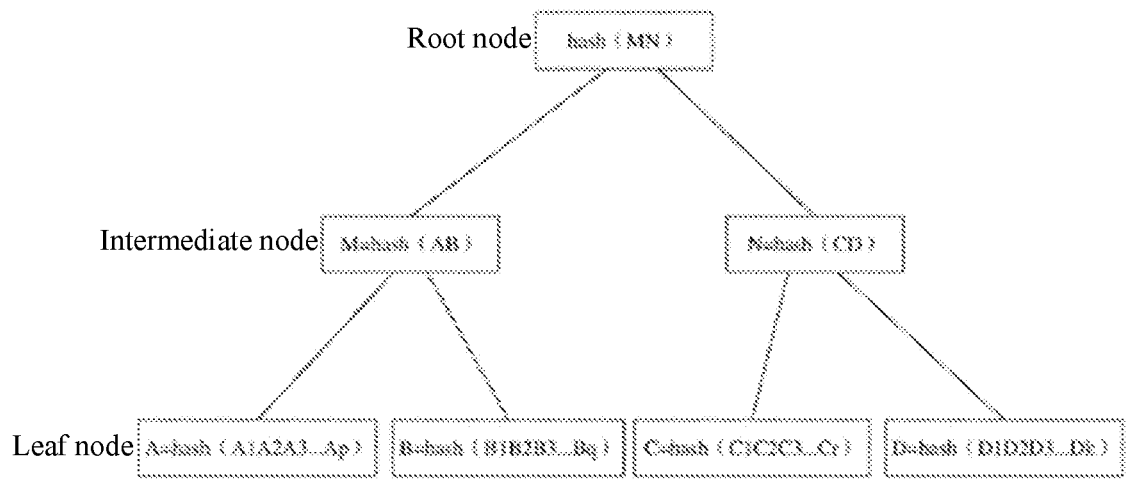
FIG. 2 is a schematic diagram of a data processing logic in accordance with some embodiments of this specification.

FIG. 2 is a schematic diagram of a data processing logic in accordance with some embodiments of this specification. As shown in FIG. 2, nodes A, B, C, and D are leaf nodes, and A1, A2, A3, . . . , Ap, B1, B2, B3, . . . , Bq, C1, C2, C3, . . . , Cr, and D1, D2, D3, . . . , Dk represent data in leaf nodes A, B, C, and D, respectively. In an example wherein the checksum is a Hash value, the Hash value of leaf node A is hash (A1A2A3 . . . Ap), the Hash value of leaf node B is hash (B1B2B3 . . . Bq), the Hash value of leaf node C is hash (C1C2C3 . . . Cr), and the Hash value of leaf node D is hash (D1D2D3 . . . Dk). M and N are intermediate nodes, and the Hash value of leaf node M is hash (AB), the Hash value of leaf node N is hash (CD). The root checksum of the root node is hash (MN). By comparing the obtained root checksum of the data in the blockchain node with the root checksum computed using the aforementioned method by the blockchain node that sends new transaction data, the blockchain node can verify the validity of the new transaction data. If the new transaction data is valid, the blockchain node may record data associated with the transaction; if the new transaction data is not valid, the blockchain node may refuse to record data associated with the transaction.

The aforementioned root checksum computation process may also be completed by the server cluster. In one example, a managing server or a managing server cluster may be provided in the server cluster, and the managing server or managing server cluster may manage and control other servers in the server cluster. After other servers in the server cluster have computed the checksums of the data of the leaf nodes, the checksums of the data of the leaf nodes may be sent to the managing server or managing server cluster. The managing server or managing server cluster may compute a root checksum of the data in the blockchain node using the above-described computation method. The managing server or managing server cluster may send the obtained root checksum of the data in the blockchain node to the blockchain node. Upon receiving the root checksum, the blockchain node may perform a validation process based on the root checksum. Detailed implementations are similar to those described in the preceding parts of this specification, and thus will not be repeated here.

In the aforementioned embodiments, the checksums of the data of the leaf nodes in the blockchain node are obtained through parallel computation by a plurality of servers in the server cluster, so that the computation of a root checksum of the data in the blockchain node does not dependent on any single terminal, thereby improving the efficiency for checksum computation.

The embodiments of this specification provides a data processing method. This method comprises: distributing, to servers in a server cluster, data of one or more leaf nodes in a blockchain node, for the servers in the server cluster to compute checksums of the data of the leaf nodes; and determining, according to the checksums of the data of the leaf nodes, a root checksum of the data in the blockchain node. In this method, the data of the leaf nodes is first distributed to the servers in the server cluster so that the checksums of the data of the leaf nodes may be computed by each server in the server cluster. Since the data can be distributed to the servers in the server cluster for parallel computation of checksums of the data of the leaf nodes, the computation time may be reduced and computation efficiency may be improved, thereby ensuring normal generation of blocks and normal operations of a blockchain.

Figure 3:
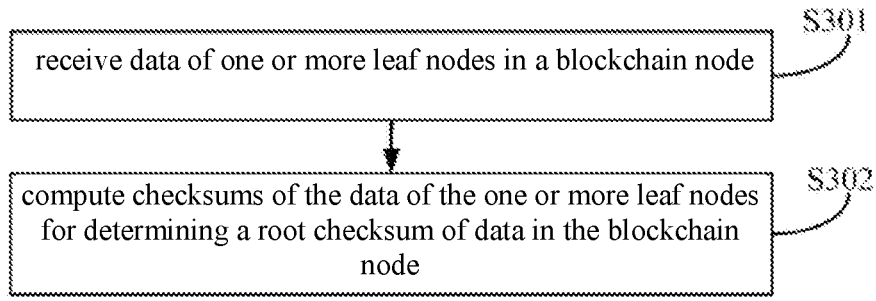
FIG. 3 is another data processing method in accordance with some embodiments of this specification.

FIG. 3 is another data processing method in accordance with some embodiments of this specification. As shown in FIG. 3, an entity for executing the method may be a server cluster, which may comprise a plurality of servers, and each server may compute a checksum of data. The method may comprise the following Steps 301 and 302.

In Step S301, data of one or more leaf nodes distributed by a blockchain node may be received by computing devices (e.g., servers in a server cluster).

In some embodiments, when data in a blockchain node needs to be verified, the blockchain node may obtain data of leaf nodes in the blockchain node, and distribute, the data of the leaf nodes to servers in the server cluster. The servers in the server cluster may receive the data of the leaf nodes distributed by the blockchain node. Related contents in Step S101 may be referenced for detailed implementations of the distribution manners and distribution process of this step, which will not be repeated here.

In Step S302, checksums of the data of the one or more leaf nodes may be computed to determine a root checksum of the data in the blockchain node.

In some embodiments, the servers in the server cluster may compute a checksum of the data of each of the leaf nodes. After the computation is completed, the servers in the server cluster may send the computed checksums to the blockchain node. Upon receiving the checksums, the blockchain node may compute a root checksum of the data in the blockchain node based on the checksums received from the servers. Related contents set forth in Step S102 may be referenced for detailed implementations this step, which will not be repeated here.

In some embodiments, the root checksum of the data in the blockchain node may also be computed by the server cluster. As described above, a management server or a management server cluster may be provided in the server cluster for performing the digest computation on the computed checksum of the data of each leaf node to determine the root checksum of the data in the blockchain node. Related contents set forth in Step S102 may be referenced for detailed implementation of this step, which will not be repeated here.

This specification provides a data processing method. According to some embodiments, this method may comprise: distributing data of one or more leaf nodes in a blockchain node to servers in a server cluster to compute checksums of the data of the leaf nodes; and determining a root checksum of the data in the blockchain node according to the checksums of the data of the leaf nodes. In this method, the data of the leaf nodes is first distributed to the servers in a server cluster so that checksums of the data of the leaf nodes may be computed by each server in the server cluster. Since the data can be distributed to the servers in the server cluster for parallel computation of the checksums of the data of the leaf nodes, the computation time may be reduced and computation efficiency may be improved, thereby ensuring normal generation of blocks and normal operations of a blockchain.

Figure 4:
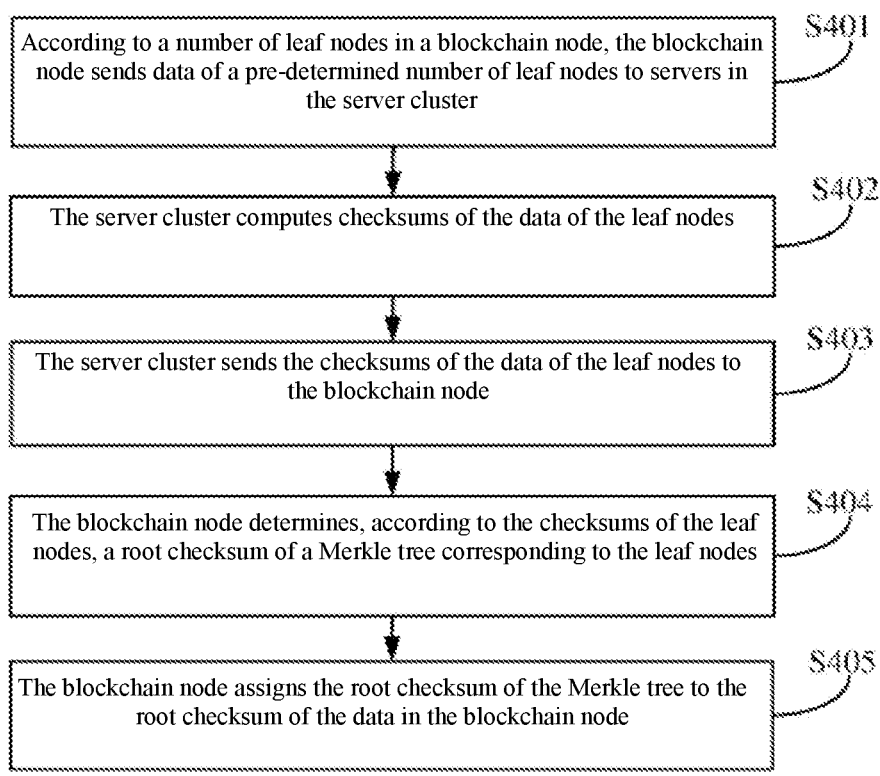
FIG. 4 is yet another data processing method in accordance with some embodiments of this specification.

FIG. 4 is yet another data processing method in accordance with some embodiments of this specification. As shown in FIG. 4, the data processing method may be executed jointly by a blockchain node and a server cluster. The embodiments of this specification will be described in details by using an example in which the checksums are Hash values. Checksums in other forms may be executed with reference to the related content in other embodiments of this specification, which will not be elaborated here. The method may comprise the following Steps 401 through 405.

In Step S401, a blockchain node may, according to a number of leaf nodes in the blockchain node, send data of a pre-determined number of the leaf nodes to servers in a server cluster.

In this specification, the pre-determined number may be set according to actual situations (for example, it may be 5, 10, etc.), which is not limited in this specification.

In some embodiments, to verify transaction data, a Merkle tree may be designed to organize the data in the blockchain node to improve the efficiency of the validation and to reduce resource consumption. In order to improve, to the maximum extent possible, the computation efficiency of checksums of the data in the blockchain node without modifying existing design mechanism, the data of the blockchain node in the embodiments of this specification may still use the Merkle tree design. A Merkle tree may comprise a plurality of leaf nodes (i.e., the buckets), and node identifiers of all leaf nodes in the Merkle tree may be recorded in the blockchain node. To validate the transaction data, the node identifiers of all leaf nodes in the Merkle tree may be obtained.

Figure 5:
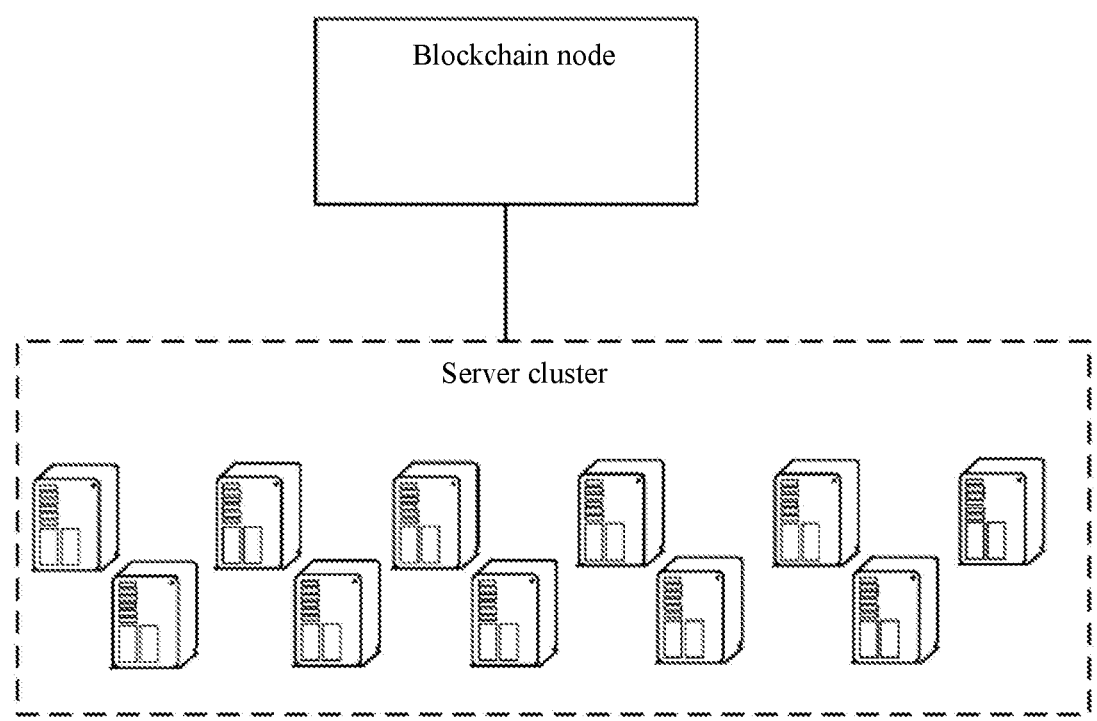
FIG. 5 is a schematic structural diagram of a data processing system in accordance with some embodiments of this specification.

FIG. 5 is a schematic structural diagram of a data processing system in accordance with some embodiments of this specification. As shown in FIG. 5, a blockchain node may obtain data of all leaf nodes based on node identifiers of all the leaf nodes, and may also obtain the number of leaf nodes stored in the blockchain node and the number of servers in the server cluster. According to the number of servers and the number of leaf nodes, the blockchain node may determine a number of leaf nodes to be assigned to each server. For example, if there is a total of 10 leaf nodes and the server cluster has a total of 10 servers, data of one leaf node may be sent to one server. Alternatively, data of a group of two or five leaf nodes may be sent to one server in the server cluster.

When the blockchain node distributes the data of the leaf nodes to the server cluster, the blockchain node may also distribute the node identifiers of the leaf nodes to the servers in the server cluster. According to the node identifiers, a server may send a data obtaining instruction comprising the node identifier to the blockchain node. Upon receiving the data obtaining instruction, the blockchain node may extract the node identifier in the data obtaining instruction, search for data of a corresponding leaf node through the node identifier, and send the data to the corresponding server. Thus, the server cluster may pull data of corresponding leaf nodes from the blockchain node.

In an example, data of the leaf nodes may also be distributed to the servers in the server cluster according to data amounts of the leaf nodes. Alternatively, data of the leaf nodes may also be distributed to the servers in the server cluster in a random manner. Related contents set forth in the embodiments in Step S101 may be referenced for detailed implementations of these steps, which will not be elaborated here.

In Step S402, the server cluster may compute checksums of the data of the leaf nodes.

In Step S403, the server cluster may send the checksums of the data of the leaf nodes to the blockchain node.

Related content set forth in the embodiments presented above may be referenced for detailed implementations of Steps S402 and S403, which will not be elaborated here.

In Step S404, the blockchain node may determine, according to the computed checksums of the leaf nodes, a root checksum of a Merkle tree corresponding to the leaf nodes.

In some embodiments, upon receiving the checksums of the leaf nodes from the servers in the server cluster, the blockchain node may construct a corresponding Merkle tree based on the leaf nodes. Since the Hash values of the leaf nodes on the Merkle tree have been determined and only the Hash value of the root node of the Merkle tree (i.e., the root checksum of the Merkle tree) has not been determined yet, the Hash value of the Merkle tree corresponding to the leaf nodes may be aggregately computed based on the Hash values of the leaf nodes. Thus the root checksum of the Merkle tree corresponding to the leaf nodes may be determined.

In Step S405, the blockchain node may assign the root checksum of the Merkle tree to the root checksum of the data in the blockchain node.

In an example, the root checksum may also be computed by the server cluster, and the process may comprise: computing checksums of the data of the leaf nodes; obtaining, based on the checksums of the data of the leaf nodes, a root checksum of data in the blockchain node, and sending the root checksum to the blockchain node. Related contents in the embodiments presented above may be referenced for detailed implementations of this step, which will not be repeated here.

The embodiments of this specification provides a data processing method. According to some embodiments, this method may comprise: distributing data of leaf nodes in a blockchain node to servers in a server cluster to compute checksums of the data of the leaf nodes; and determining a root checksum of the data in the blockchain node according to the checksums of the data of the leaf nodes. In this method, the data of the leaf nodes is first distributed to the servers in the server cluster so that checksums of the data of the leaf nodes may be computed by each server in the server cluster. Since the data can be distributed to the servers in the server cluster for parallel computation of checksums of the data of the leaf nodes, the computation time may be reduced and computation efficiency may be improved, thereby ensuring normal generation of blocks and normal operations of a blockchain.

Figure 6:
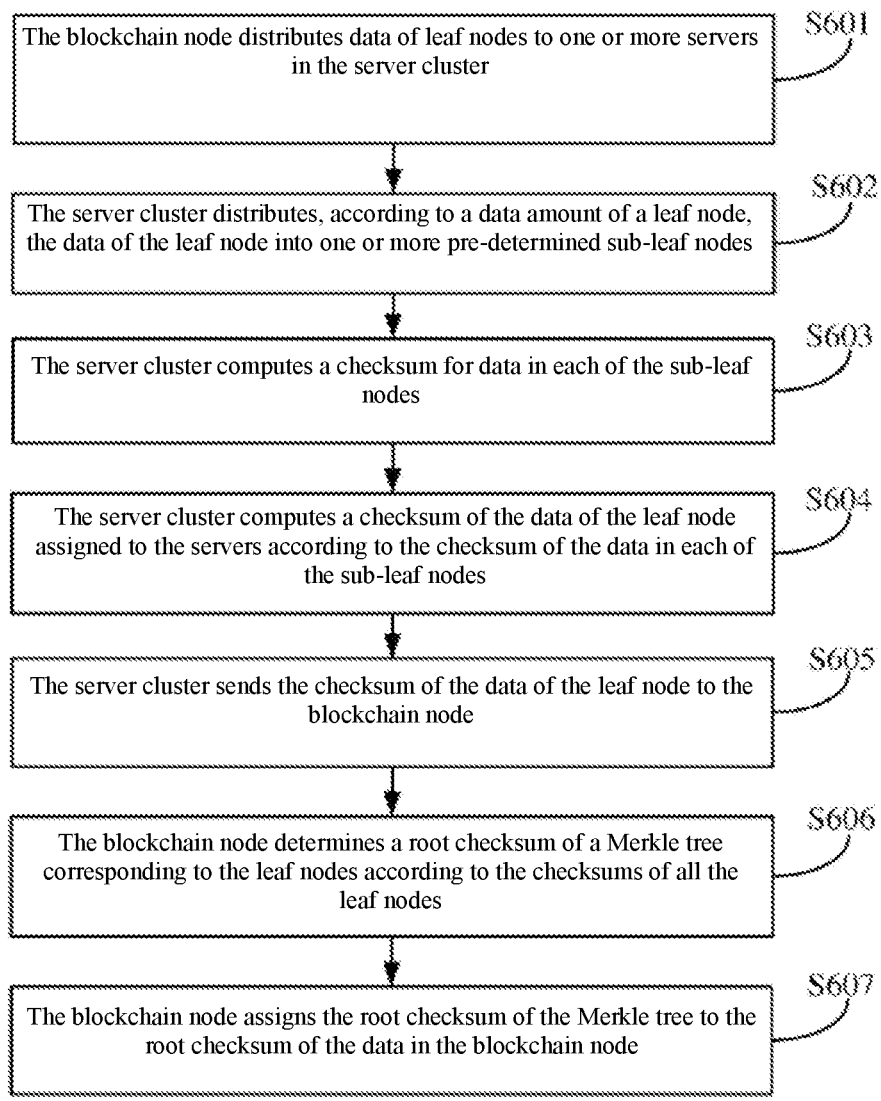
FIG. 6 is yet another data processing method in accordance with some embodiments of this specification.

FIG. 6 is yet another data processing method in accordance with some embodiments of this specification. As shown in FIG. 6, the data processing method may be executed jointly by a blockchain node and a server cluster. The embodiments of this specification will be described in detail using an example in which the checksums are Hash values. Checksums in other forms may be executed with reference to the related content in other embodiments of this specification, which will not be elaborated here. The method may comprise the following Steps S601 through S607.

In Step S601, a blockchain node may distribute data of leaf nodes to one or more servers in the server cluster.

The one or more servers in the server cluster may include the blockchain node. Related contents in the embodiments in Step S601 may be referenced for detailed implementations of this step, which will not be repeated here.

In Step S602, the server cluster may distribute, according to a data amount of a leaf node, the data of the leaf node into one or more pre-determined sub-leaf nodes.

In this specification, there may be no association relationship, such as a superior-subordinate relationship or a parent-child relationship, between the sub-leaf nodes and the leaf nodes. A sub-leaf node may be a data packet comprising one or more pieces of data, while a leaf node (bucket) may be a container in the Merkle tree for storing data. The number of sub-leaf nodes may be greater than the number of leaf nodes. For example, if the number of leaf nodes is 5, the number of sub-leaf nodes may be 20.

In some embodiments, one or more leaf nodes in the blockchain node may have larger data amount (e.g., one million pieces of data, etc.) than other leaf nodes. When the data of such leaf nodes is distributed to a server in the server cluster for computing the Hash value of the leaf nodes, the server needs to splice the large amount of data in the leaf node to obtain a spliced character string, and then compute the Hash value of the spliced character string. This is a time-consuming process that may consume large resource on the servers. To address this issue, a plurality of sub-leaf nodes may be pre-determined, with data capacity of each sub-leaf node being set according to actual needs (for example, data capacity of each sub-leaf node may be set at 1 GB or 500 MB). Then the data of a leaf node may be distributed (e.g., randomly or equally) to each of the pre-determined sub-leaf nodes.

There may be a variety of ways to implement Step S602. One possible way to implement Step S602 may comprise: sorting the data of a leaf node, sequentially distributing a pre-determined number of pieces of data from the sorted data of the leaf node to the sub-leaf nodes, and setting sub-node identifiers for the sub-leaf nodes.

According to data processing rate and checksum computation rate of each server in the server cluster and the number of servers in the server cluster, the server cluster may determine an amount of data that each server is capable of processing to ensure a high overall data processing efficiency (e.g., higher than a set efficiency threshold). Then the server cluster may determine an amount of data (or a number of pieces of data) that each sub-leaf node can accommodate. The server cluster may further compute the total amount of data of the leaf node to be distributed to each server, and sort the data of the leaf node according to timestamps indicating the time when the data is stored into the blockchain node. Then the server cluster may sequentially distribute a pre-determined number of pieces of data from the sorted data of the leaf node to the sub-leaf nodes, and set sub-node identifiers for the sub-leaf nodes. The sub-node identifiers may be set according to the order of the data, and may indicate relative positions of the data of a sub-leaf node in the data of all sub-leaf nodes.

For example, a leaf node assigned by a server in the server cluster may have 50 pieces of data. Assuming each piece of data is 5 MB, the total data amount will be 250 MB. If the amount of data that can be accommodated by each sub-leaf node is 25 MB, then 10 (computed by 250/25=10) sub-leaf nodes may be needed, and numbers 1-10 may be used as sub-node identifiers for each of these sub-leaf nodes, respectively, according to the order of the data. After the aforementioned process, the storage positions of the 50 pieces of data may be as follows: Nos. 1-5 pieces of data may be sequentially stored in the sub-leaf node number 1, Nos. 6-10 pieces of data may be sequentially stored in the sub-leaf node number 2, Nos. 11-15 pieces of data may be sequentially stored in the sub-leaf node number 3, and so on. Thus the storage position of each piece of data may be determined. Since each piece of data is 5 MB, each sub-leaf node may comprise 5 pieces of data.

In Step S603, the server cluster may compute a checksum for data in each of the sub-leaf nodes.

In some embodiments, upon obtaining corresponding sub-leaf nodes, the servers in the server cluster may obtain data stored in the sub-leaf nodes and compute a checksum for the data in each of the sub-leaf nodes using a pre-determined validation algorithm. For example, data stored in a sub-leaf node may first be sorted, then Secure Hash Algorithm 256 (SHA256) may be used to compute, based on the sorted data, an SHA256 value (i.e., a Hash value), which will be the checksum of the sub-leaf node.

In Step S604, the server cluster may compute a checksum of the data of the leaf node assigned to the server according to the checksum of the data in each of the sub-leaf nodes.

In some embodiments, after the server cluster obtains the checksum of each sub-leaf node, the checksums of the sub-leaf nodes may be sorted based on the order of the sub-node identifiers. Then, the server cluster may, based on the checksums of the sub-leaf nodes, aggregately compute a checksum of the corresponding leaf node using a pre-determined validation algorithm, thereby obtaining a checksum of the data of the leaf node assigned by the blockchain node.

For example, in the example elaborated in the Step S602, Hash values of the data of 10 sub-leaf nodes may be obtained through the process described in the Step S603. Since the data of the 10 sub-leaf nodes is distributed from the data of one leaf node, a Hash value of this leaf node may be determined by aggregating the obtained Hash values of the data of 10 sub-leaf nodes, as shown in FIG. 2.

The data of sub-leaf nodes may also be obtained in a pulling manner through the sub-node identifiers of the sub-leaf nodes. In that case, the processes of Step S604 may be as follows: computing a checksum of the data of the leaf node according to the sub-node identifiers of the sub-leaf nodes and the checksum of the data in each of the sub-leaf nodes. Related contents in preceding parts may be referenced for detailed implementations of this step, which will not be repeated here.

In Step S605, the server cluster may send the checksum of the data of the leaf node to the blockchain node.

In Step S606, the blockchain node may determine a root checksum of a Merkle tree corresponding to the leaf nodes according to the checksums of all the leaf nodes.

In some embodiments, a root checksum of data in the blockchain node may be computed using a pre-determined validation algorithm based on the checksums of the leaf nodes. For example, according to positions of leaf nodes corresponding to the recorded node identifiers in all leaf nodes in a blockchain node, a node distribution tree (i.e., a Merkle tree) formed by the leaf nodes may be obtained. The node distribution tree may have a structure of A-B-C-F, A-B-E, and A-D. When the checksums of the leaf nodes (i.e., checksums of B+C+D+E+F) are obtained, a root checksum of the Merkle tree may be computed according to the checksums of the leaf nodes, thereby obtaining the root checksum of the data of the blockchain node.

In Step S607, the blockchain node may assign the root checksum of the Merkle tree to the root checksum of the data in the blockchain node.

Related contents in related embodiments presented above may be referenced for detailed implementations of Steps S605 to S607, which will not be repeated here.

This specification provides a data processing method. According to some embodiments, this method may comprise: distributing node identifiers of leaf nodes to a server cluster, causing the server cluster to distribute each of a pre-determined number of pieces of data to sub-leaf nodes according to the obtained amounts of data stored in the leaf nodes in a blockchain node, then computing a checksum of each sub-leaf node, determining checksums of the corresponding leaf nodes, and lastly, providing the checksums of the leaf nodes to a blockchain node for computing a checksum of the data in the blockchain node. In this method, the data stored in the leaf nodes is re-distributed by the server cluster to obtain the sub-leaf nodes so that checksums of the sub-leaf nodes may be computed. Since the data may be evenly distributed to the server cluster for parallel computation of the checksums, the computation time may be reduced and computation efficiency may be improved, thereby ensuring normal generation of blocks and normal operations of a blockchain.

Figure 7:
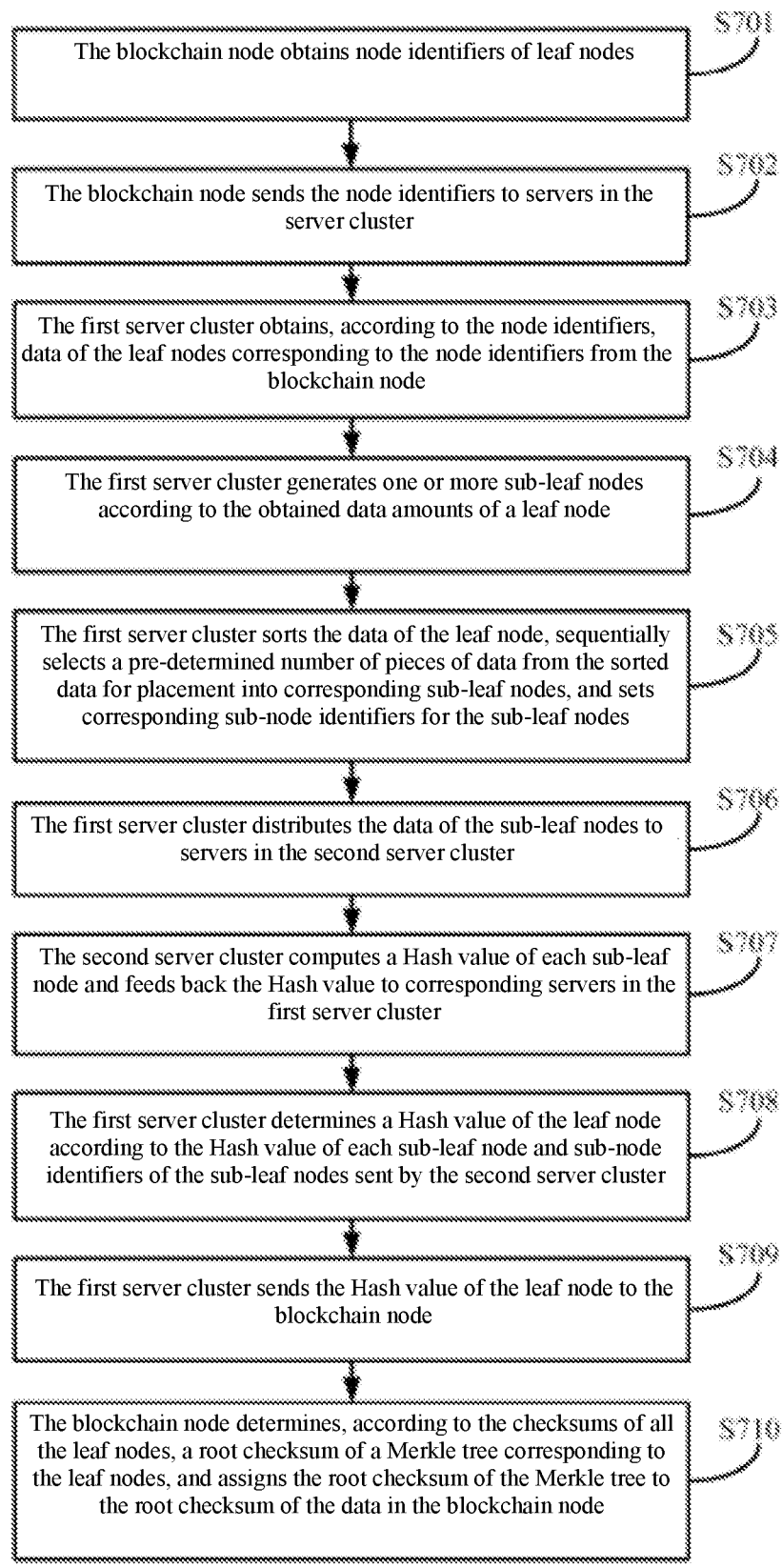
FIG. 7 is yet another data processing method in accordance with some embodiments of this specification.
Figure 8:
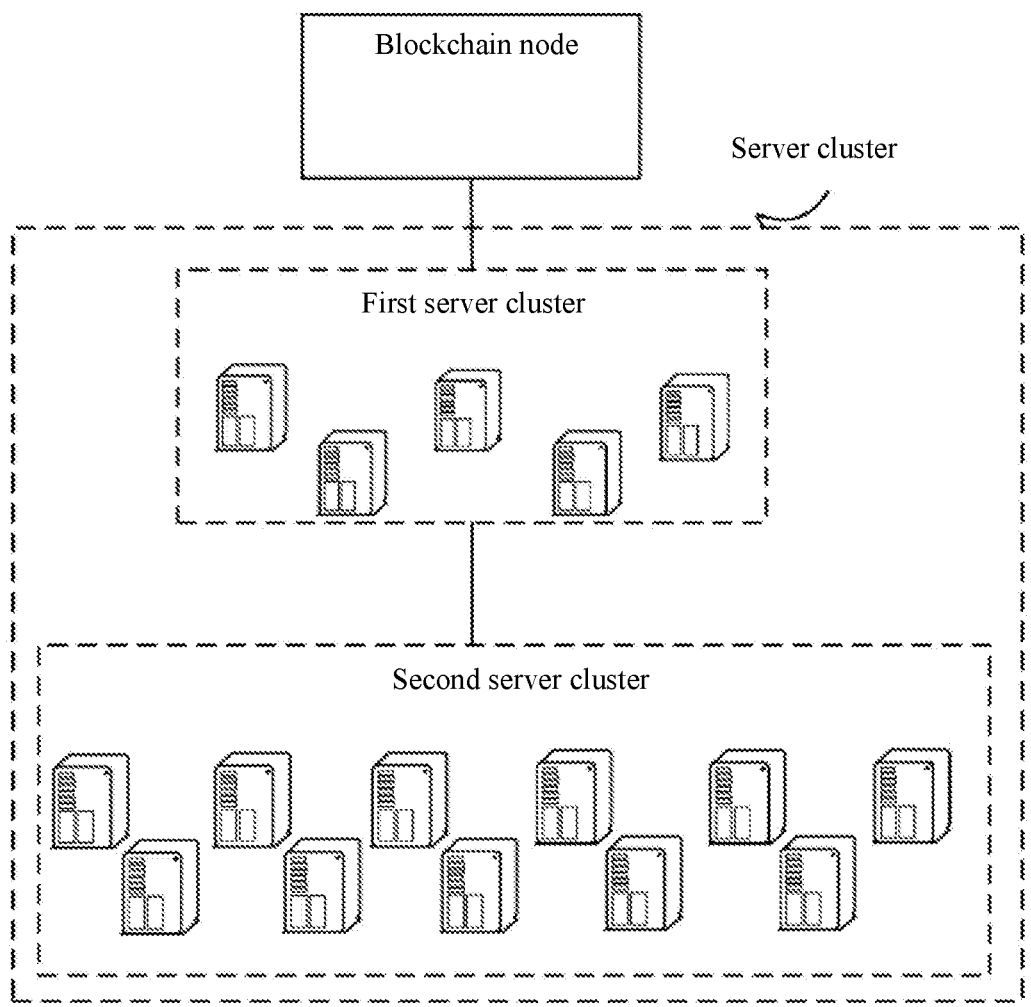
FIG. 8 is a schematic structural diagram of another data processing system in accordance with some embodiments of this specification.

FIG. 7 is yet another data processing method in accordance with some embodiments of this specification. As shown in FIG. 7, the data processing method may be executed jointly by a blockchain node and a server cluster. In this specification, the server cluster may comprise a first server cluster and a second server cluster, as shown in FIG. 8. FIG. 8 provides a data processing system. The data processing system may comprise server clusters on two levels, i.e., the first server cluster and the second server cluster, wherein the first server cluster is at a level below the blockchain node, and the second server cluster is at a level below the first server cluster. This hierarchical structure allows data to be further processed (e.g., data recombination, data distribution, etc.) to accelerate the data processing rate. The embodiments of this specification will be described in detail by using an example in which the checksums are Hash values. Checksums in other forms may be executed with reference to the related contents in other embodiments of this specification, which will not be elaborated here. The method may comprise the following Steps S701 through S710.

In Step S701, a blockchain node may obtain node identifiers of leaf nodes.

In some embodiments, when data is stored in a blockchain node, leaf nodes may be correspondingly generated in the blockchain node, and a node identifier of may be generated for each leaf node. The blockchain may comprise a plurality of leaf nodes, and each leaf node may store a certain amount of data. Whenever a node identifier is generated, the node identifier may be stored, and the position of the leaf node corresponding to the node identifier in all leaf nodes of the blockchain node may be recorded. For example, a generated node identifier may be F, and the position of the leaf node corresponding to the node identifier may be A-B-C-F.

In Step S702, the blockchain node may send the node identifiers to servers in the server cluster.

In some embodiments, based on the system structure shown in FIG. 8, the blockchain node may obtain data stored in the leaf nodes of the blockchain node, and may divide node identifiers of the leaf nodes into one or more groups either randomly or according to a pre-determined distribution rule. Each group of the node identifiers may be sent to one server in the first server cluster.

In Step S703, the first server cluster may obtain, according to the node identifiers, data of the leaf nodes corresponding to the node identifiers from the blockchain node.

In some embodiments, a server in the first server cluster may send a data acquisition instruction comprising the node identifiers to a blockchain device, and then the server may fetch data of the leaf nodes corresponding to the node identifiers from a blockchain node.

In Step S704, the first server cluster may generate one or more sub-leaf nodes according to the obtained data amounts of a leaf node.

In this specification, as described above, there may be no association relationship, such as a superior-subordinate relationship or a parent-child relationship, between the sub-leaf nodes and the leaf node. A sub-leaf node may be a data packet comprising one or more pieces of data, while a leaf node (bucket) may be a container in a Merkle tree for storing data.

In some embodiments, an amount of data or a number of pieces of data (e.g., 100 MB or 10 pieces) that a sub-leaf node can accommodate may be determined. The total amount of data of the leaf nodes assigned to each server in the first server cluster may be computed, and one or more sub-leaf nodes may be generated according to the amount of data or the number of pieces of data that each sub-leaf node can accommodate.

In Step S705, the first server cluster may sort the data of the leaf node, sequentially select a pre-determined number of pieces of data from the sorted data for placement into corresponding sub-leaf nodes, and set corresponding sub-node identifiers for the sub-leaf nodes.

In some embodiments, computation time needed by any server in the first server cluster to compute Hash values for one and more pieces of data may be pre-tested by conducting test runs. Then a number of pieces of data corresponding to a relatively short computation time and a relatively low processing burden on the server may be selected. This piece number (e.g., 30 or 50 pieces) may be set as the pre-determined piece number. Since each piece of data is provided with a timestamp in storage or transaction, the time of storage or transaction of each piece of data may be determined through the timestamp. Thus, the timestamp in each piece of data may first be obtained, and a plurality of pieces of data may be sorted according to the order of the timestamps. A pre-determined number of pieces of data may be sequentially selected from the sorted plurality of pieces of data and distributed into corresponding sub-leaf nodes. To label the order of the distributed data in different sub-leaf nodes, sub-node identifiers may be set for corresponding sub-leaf nodes based on the distributed data.

In one example, the pre-determined number of pieces of data may be three pieces, and data of a leaf node may comprise A, B, C, D, E, F, G, H, and K. After the data is sorted according to the timestamps, the order of the above data may become H-G-F-E-D-C-B-A-K. Then, the first three pieces of sorted data (H-G-F) may be distributed into one sub-leaf node, the next three pieces of sorted data (E-D-C) may be distributed into another sub-leaf node, and yet another three pieces of data (B-A-K) may be distributed into yet another sub-leaf node. To label the order of data stored in the three sub-leaf nodes, the sub-node identifier of the sub-leaf node where H-G-F is located may be set as sub-node 1, the sub-node identifier of the sub-leaf node where E-D-C is located may be set as sub-node 2, and the sub-node identifier of the sub-leaf node where B-A-K is located may be set as sub-node 3.

In Step S706, the first server cluster may distribute the data of the sub-leaf nodes to servers in the second server cluster.

In some embodiments, index data such as the currently remaining bandwidth and/or data transmission rate of each server in the second server cluster may be obtained. The computation capability of each server in the first server cluster may be evaluated based on the obtained index data, and the data of corresponding sub-leaf nodes may be sent to the servers in the second server cluster according to the computation capabilities.

Additionally, to improve the computation efficiency as much as possible, the number of the sub-leaf nodes distributed to the servers in the second server cluster may be adjusted. In one example, index data such as current remaining bandwidth and/or data transmission rate of each server in the second server cluster may be obtained. The computation capability of each server may be evaluated based on the obtained index data, and corresponding sub-leaf nodes may be distributed to the servers in the second server cluster according to the computation capabilities. In one example, the second server cluster may comprise five servers, and two sub-leaf nodes may be distributed to each server. If it is determined through computation that a server in the second server cluster has the most powerful computation capability, then the data of three of the above ten sub-leaf nodes may be sent to this server. If it is determined through computation that a server in the second server cluster has the weakest computation capability, then the data of only one of the above ten sub-leaf nodes may be sent to this server. In the above-described manner, the generated one or more sub-leaf nodes may be provided to the servers in the second server cluster in a balanced manner.

In Step S707, the second server cluster may compute a Hash value of each sub-leaf node and send back the Hash value to corresponding servers in the first server cluster.

In some embodiments, after a server in the second server cluster receives corresponding sub-leaf nodes, the server may extract data in each sub-leaf node and sort the data according to the order of timestamps of the data. The server may obtain a character string formed by the sorted data and use a pre-determined Hash algorithm to compute a Hash value of this character string (i.e., the Hash value of the sub-leaf node). With the above-described method, the second server cluster may obtain a Hash value of each sub-leaf node, which may then be sent, via corresponding servers, to corresponding servers in the first server cluster.

In Step S708, the first server cluster may determine a Hash value of the leaf node according to the Hash value of each sub-leaf node and sub-node identifiers of the sub-leaf nodes sent by the second server cluster.

In some embodiments, after the servers in the first server cluster receive the checksums of the sub-leaf nodes returned by the second server cluster, the servers may obtain a sub-node identifier of each sub-leaf node, respectively. Then, the servers may sort the sub-leaf nodes according to the sub-node identifier of each sub-leaf node, and may gather Hash values of the sorted sub-leaf nodes to obtain Hash values of the sub-leaf nodes. For example, an order of Hash values of the sub-leaf nodes may be determined according to the order of the sub-leaf nodes, and the sorted Hash values may form a character string. A Hash value of the character string may be computed using a pre-determined Hash algorithm, and the Hash value may be the Hash value of the corresponding leaf node. In addition, other Hash value computation methods may be used to determine the Hash values of the leaf nodes. For example, an average of Hash values of one or more sub-leaf nodes may be computed as the Hash value of a leaf node. Alternatively, the Hash value of a leaf node may be obtained based on a weight of each sub-leaf node and a Hash value of each sub-leaf node.

In Step S709, the first server cluster may send the Hash value of the leaf node to the blockchain node.

In Step S710, the blockchain node may determine, according to the checksums of all the leaf nodes, a root checksum of a Merkle tree corresponding to the leaf nodes, and assign the root checksum of the Merkle tree to the root checksum of the data in the blockchain node.

This specification provides a data processing method. According to some embodiments, the method may comprise: generating, according to an amount of data of leaf nodes in a blockchain node, one or more sub-leaf nodes assigned with a pre-determined number of pieces of data, then distributing the sub-leaf nodes to a second server cluster for computing a checksum of each sub-leaf node, determining checksums of the corresponding leaf nodes according to the checksum of each sub-leaf node, and lastly, providing the checksums of the leaf nodes to the blockchain node for computing a root checksum of the data in the blockchain node. In this method, the data stored in the leaf nodes is re-distributed by a first server cluster to obtain the sub-leaf nodes, and then the sub-leaf nodes are distributed to the second server cluster for computing checksums. Since the data may be evenly distributed to the second server cluster for parallel computation of the checksums, the computation time may be reduced and computation efficiency may be improved, thereby ensuring normal generation of blocks and normal operations of a blockchain.

Figure 9:
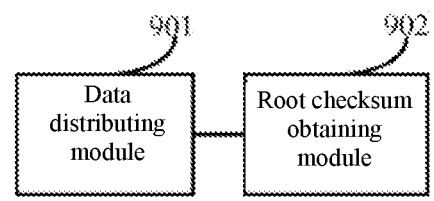
FIG. 9 is a data processing device in accordance with some embodiments of this specification.

The above-described are the data processing methods provided by this specification. Based on the same concept, this specification further provides a data processing device, as shown in FIG. 9.

The data processing device may be a blockchain node provided in the aforementioned embodiments, and in one example, may be a terminal device (e.g., a personal computer, etc.) or a server. The device may comprise a data distributing module 901 and a root checksum obtaining module 902.

The data distributing module 901 may be configured to distribute, to servers in a server cluster, data of leaf nodes in a blockchain node, for the servers in the server cluster to compute checksums of the data of the leaf nodes respectively assigned to the servers.

The root checksum obtaining module 902 may be configured to obtain, according to the checksums of the data of the leaf nodes computed by the servers in the server cluster, a root checksum of the data in the blockchain node.

In some embodiments, the root checksum obtaining module 902 may be configured to receive the root checksum of the data in the blockchain node sent by the servers in the server cluster.

In some embodiments, the root checksum obtaining module 902 may be configured to determine, according to the checksums of the leaf nodes, a root checksum of a Merkle tree corresponding to the leaf nodes; and assign the root checksum of the Merkle tree to a root checksum of the data in the blockchain node.

In some embodiments, the data distributing module 901 may be configured to, according to a number of leaf nodes prestored in the blockchain node, send data of a pre-determined number of leaf nodes to servers in the server cluster.

In some embodiments, the checksums may be Hash values.

This specification provides a data processing device configured to distribute, to servers in a server cluster, data of leaf nodes in a blockchain node, for the servers in the server cluster to compute checksums of the data of the leaf nodes respectively assigned to the servers; and obtain, according to the checksums of the data of the leaf nodes computed by the servers in the server cluster, a root checksum of the data in the blockchain node. In this device, the data of the leaf nodes may be distributed to the server cluster and checksums of the data of the leaf nodes assigned to the servers may be computed by each server in the server cluster. Since the data may be distributed to the server cluster for parallel computation of checksums of the data of the leaf nodes, the computation time may be reduced and computation efficiency may be improved, thereby ensuring normal generation of blocks and normal operations of a blockchain.

Figure 10:
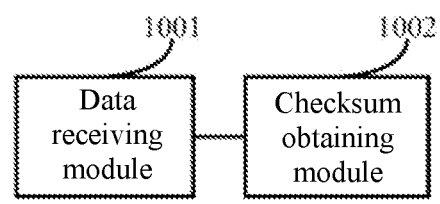
FIG. 10 is another data processing device in accordance with some embodiments of this specification.

Based on the same concept, this specification further provides a data processing device, as shown in FIG. 10.

The data processing device may be the server cluster provided in the above embodiments, and the device may comprise a data receiving module 1001 and a checksum obtaining module 1002.

The data receiving module 1001 may be configured to receive data of leaf nodes distributed by a blockchain node.

The checksum obtaining module 1002 may be configured to compute checksums of the data of the leaf nodes to obtain a root checksum of the data in the blockchain node.

In some embodiments, the device may further comprise:

a data allocating module configured to, according to a data amount of the leaf nodes, distribute the data of the leaf nodes into pre-determined sub-leaf nodes;

a computing module configured to compute a checksum of the data of each sub-leaf node.

Correspondingly, the checksum obtaining module 1002 may be configured to, according to the checksum of the data of each sub-leaf node, compute checksums of the data of the leaf nodes.

In some embodiments, the data allocating module may be configured to sort the data of the leaf nodes, sequentially select a pre-determined number of pieces of data from the sorted data for placement into the sub-leaf nodes, and set corresponding sub-node identifiers for the sub-leaf nodes.

Correspondingly, the checksum obtaining module 1002 may be configured to, according to the sub-node identifiers of the sub-leaf nodes and the checksum of each of the sub-leaf nodes, compute checksums of the data of the leaf nodes.

In some embodiments, the checksum obtaining module 1002 may be configured to compute checksums of the data of the leaf nodes, and send the checksums of the data of the leaf nodes to the blockchain node for the blockchain node to compute a root checksum of the data in the blockchain node according to the checksums of the data of the leaf nodes; or compute checksums of the data of the leaf nodes; obtain a root checksum of the data in the blockchain node based on the checksums of the data of the leaf nodes, and send the root checksum to the blockchain node.

This specification provides a data processing device configured to distribute, to servers in a server cluster, data of leaf nodes prestored in a blockchain node, for the servers in the server cluster to compute checksums of the data of the leaf nodes; and obtain, according to the checksums of the data of the leaf nodes computed by the servers in the server cluster, a root checksum of the data in the blockchain node. In this device, the data of the leaf nodes may be distributed to the server cluster and then checksums of the data of the leaf nodes may be computed by each server in the server cluster. Since the data may be distributed to the server cluster for parallel computation of checksums of the data of the leaf nodes, the computation time may be reduced and computation efficiency may be improved, thereby ensuring normal generation of blocks and normal operations of a blockchain.

One of ordinary skill in the art can understand details about the operation and processes of the system and apparatus described above by referring to corresponding processes in the method embodiments described above. In some embodiments, the division of the modules may be logical or functional. Alternative methods of division may be used. Multiple modules or components may be combined or integrated into another system. Some features may be omitted or not executed. The mutual coupling, direct coupling, or communication connection that is illustrated or discussed may be replaced by indirect coupling or communication connection through suitable communication interfaces, apparatuses, or modules, which may be electrical, mechanical, or in other suitable forms.

Each of the processes, methods, and algorithms described in the preceding sections may be embodied in, and fully or partially automated by, software or code modules to be executed by one or more computer systems or computer processors comprising computer hardware. The processes and algorithms may be implemented partially or wholly in application-specific circuitry.

The software or code modules may be implemented as separate sections or blocks of program code. One or more of the software or code modules may alternatively be integrated into one section or block of program code. When the functions disclosed herein are implemented in the form of software functional modules and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments disclosed herein. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of this specification. Such embodiments of the subject matter may be referred to herein, individually or collectively, by the term "invention" merely for convenience and without intending to voluntarily limit the scope of this specification to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this specification. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of this specification. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of this specification as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A data processing method, comprising:
   distributing, by a blockchain node, to one or more computing devices, data of each of one or more leaf nodes that is stored in the blockchain node, wherein the data of each of the one or more node leaf nodes comprises at least a portion of data of the blockchain node;

computing, for each of the one or more leaf nodes, by the one or more computing devices, a first checksum of the data of each of the one or more leaf nodes, by:
sorting the date of each of the one or more leaf nodes according to timestamps of the data of each of the one or more leaf nodes, wherein each of the timestamps indicates a time the corresponding data is stored in the blockchain node;
sequentially distributing a preset amount of sorted data of each of the one or more leaf nodes to a plurality of sub-leaf nodes, wherein each of the plurality of sub-leaf nodes only includes data from the corresponding leaf node, and the preset amount is determined based on a data processing rate and a checksum computation rate of each of the one or more computing devices;
computing, by the one or more computing devices, a second checksum for data of each of the plurality of sub-leaf nodes; and
computing, according to the second checksums, the first checksum of the date of each of the one or more leaf nodes; and
determining, according to the first checksum of the data of each of the one or more leaf nodes, a root checksum of data in the blockchain node.

2. The method of claim 1, wherein the one or more computing devices include the blockchain node.

3. The method of claim 1, wherein the distributing, to one or more computing devices, data of each of one or more leaf nodes that is stored in the blockchain node comprises:
distributing, to the one or more computing devices, node identifiers of the one or more leaf nodes;
receiving, from the one or more computing devices, data obtaining instructions comprising the node identifiers; and
distributing, to the one or more computing devices, data of each of the one or more leaf nodes in the blockchain node according to the data obtaining instructions.

4. The method of claim 1, wherein the determining a root checksum of data in the blockchain node comprises:
receiving the root checksum of the data in the blockchain node from the one or more computing devices.

5. The method of claim 1, wherein the determining a root checksum of data in the blockchain node comprises:
determining, according to the first checksum of the data of each of the one or more leaf nodes, a root checksum of a Merkle tree corresponding to the one or more leaf nodes; and
assigning the root checksum of the Merkle tree to the root checksum of the data in the blockchain node.

6. The method of claim 1, wherein the distributing data of each of one or more leaf nodes that is stored in the blockchain node comprises:
distributing, according to a number of the leaf nodes in the blockchain node, data of a pre-determined number of the leaf nodes to the one or more computing devices.

7. The method of claim 1, wherein the distributing data of each of one or more leaf nodes that is stored in the blockchain node comprises:
distributing the data of each of the one or more leaf nodes in the blockchain node equally to each of the one or more computing devices.

8. The method of claim 1, wherein the first checksum of the data of each of the one or more leaf node is a Hash value of the data of each of the one or more leaf nodes.

9. The method of claim 1, further comprising:
setting sub-node identifiers for the sub-leaf nodes,
wherein the computing the first checksum of the data of each of the one or more leaf nodes comprises:
computing, according to the sub-node identifiers of the sub-leaf nodes and the second checksum of the data in each of the plurality of sub-leaf nodes, the first checksum of the data of each of the one or more leaf nodes.

10. The method of claim 1, wherein the determining the root checksum of data in the blockchain node comprises:
sending the first checksum of the data in each of the one or more leaf nodes to the blockchain node for the blockchain node to compute the root checksum of the data in the blockchain node based on the first checksums; or
determining, in one leaf node of the one or more leaf nodes, the root checksum of the data in the blockchain node based on the first checksum of the data of each of the one or more leaf nodes, and sending the root checksum to the blockchain node.

11. A data processing device, comprising one or more processors and one or more non-transitory machine-readable memories coupled to the one or more processors and configured with instructions executable by the one or more processors to cause the device to perform operations comprising:
distributing, to one or more computing devices, data of each of one or more leaf nodes that is stored in a blockchain node, wherein data of each of the one or more node leaf nodes comprises at least a portion of data of the blockchain node;
computing, for each of the one or more leaf nodes, a first checksum of the data of each of the one or more leaf nodes, by:
sorting the date of each of the one or more leaf nodes according to timestamps of the data of each of the one or more leaf nodes, wherein each of the timestamps indicates a time the corresponding data is stored in the blockchain node;
sequentially distributing a preset amount of sorted data of each of the one or more leaf nodes to a plurality of sub-leaf nodes, wherein each of the plurality of sub-leaf nodes only includes data from the corresponding leaf node, and the preset amount is determined based on a data processing rate and a checksum computation rate of each of the one or more computing devices;
computing a second checksum for data of each of the plurality of sub-leaf nodes; and
computing, according to each of the second checksums, the first checksum of the date of each of the one or more leaf nodes; and
determining, according to the first checksum of the data of each of the one or more leaf nodes, a root checksum of data in the blockchain node.

12. The device of claim 11, wherein in determining a root checksum of data in the blockchain node, the operations comprise:
determining, according to the first checksum of the data of each of the one or more leaf nodes, a root checksum of a Merkle tree corresponding to the one or more leaf nodes; and
assigning the root checksum of the Merkle tree to the root checksum of the data in the blockchain node.

13. The device of claim 11, wherein in distributing data of each of one or more leaf nodes that is stored in a blockchain node, the operations comprise:

distributing the data of each of the one or more leaf nodes in the blockchain node equally to each of the one or more computing devices.

14. The device of claim 11, wherein the first checksum of the data of each of the one or more leaf nodes is a Hash value of the data of each of the one or more leaf nodes.

15. The device of claim 11, wherein the operations further comprise:
setting sub-node identifiers for the sub-leaf nodes,
and wherein in computing the first checksum of the data of each of the one or more leaf nodes, the operations comprise:
computing, according to the sub-node identifiers of the sub-leaf nodes and the second checksum of the data in each of the plurality of sub-leaf nodes, the first checksum of the data of each of the one or more leaf nodes.

16. The device of claim 11, wherein in determining a root checksum of data in the blockchain node, the operations comprise:
sending the first checksums of the data in each of the one or more leaf nodes to the blockchain node for the blockchain node to compute the root checksum of the data in the blockchain node based on the first checksums; or
determining the root checksum of the data in the blockchain node based on the first checksums of the data of each of the one or more leaf nodes, and sending the root checksum to the blockchain node.

\* \* \* \* \*

UNITED STATES PATENT AND TRADEMARK OFFICE
CERTIFICATE OF CORRECTION

| | |
|---|---|
| PATENT NO. | : 11,392,612 B2 |
| APPLICATION NO. | : 16/507983 |
| DATED | : July 19, 2022 |
| INVENTOR(S) | : Honglin Qiu |

It is certified that error appears in the above-identified patent and that said Letters Patent is hereby corrected as shown below:

In the Claims

Claim 1, Column 21, Line 4:
"sorting the date" should read -- sorting the data --.

Claim 1, Column 21, Line 21:
"the first checksum of the date" should read -- the first checksum of the data --.

Claim 11, Column 22, Line 36:
"sorting the date" should read -- sorting the data --.

Claim 11, Column 22, Line 52:
"the first checksum of the date" should read -- the first checksum of the data --.

Signed and Sealed this
Sixth Day of June, 2023

Katherine Kelly Vidal
*Director of the United States Patent and Trademark Office*